Figure 1:
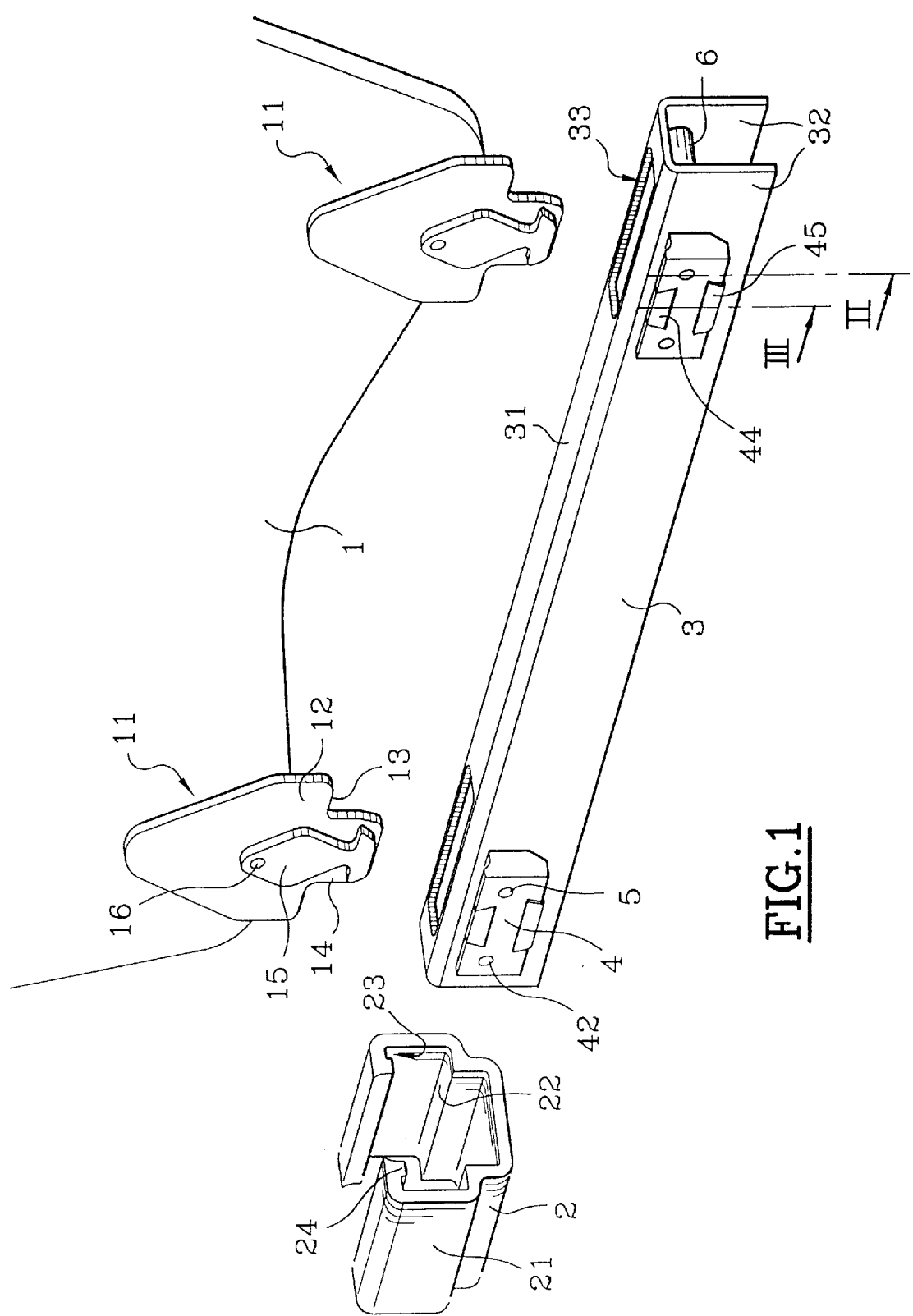

United States Patent [19]
Moradell et al.

[11] Patent Number: 5,921,606
[45] Date of Patent: Jul. 13, 1999

[54] SLIDE FOR A REMOVABLE AUTOMOBILE VEHICLE SEAT

[75] Inventors: Pierre Moradell; Dominique Folliot; Jean-Luc Bouhelier, all of Flers, France

[73] Assignee: Berstrand Faure Equipments S.A., Boulogne Cedex, Canada

[21] Appl. No.: 09/148,893

[22] Filed: Sep. 8, 1998

[30] Foreign Application Priority Data

Sep. 12, 1997 [FR] France .................................. 97 11528

[51] Int. Cl.⁶ ...................................... B60N 2/08
[52] U.S. Cl. ................................ 296/65.03; 296/65.14; 248/429
[58] Field of Search ............................ 296/65.01, 65.03, 296/65.11, 65.13, 65.14; 297/344.1; 248/429

[56] References Cited

U.S. PATENT DOCUMENTS

| | | | |
|---|---|---|---|
| 4,712,824 | 12/1987 | Naert ..................................... | 296/65 R |
| 4,949,931 | 8/1990 | Fujiwara et al. ........................ | 248/429 |
| 5,188,329 | 2/1993 | Takahara ................................ | 248/430 |
| 5,213,300 | 5/1993 | Rees ...................................... | 248/429 |
| 5,280,987 | 1/1994 | Miller .................................... | 296/65.1 |
| 5,330,245 | 7/1994 | Boisset .................................. | 296/65.1 |
| 5,337,979 | 8/1994 | Bales et al. ........................... | 244/118.1 |
| 5,364,152 | 11/1994 | Mastrangelo et al. .................. | 296/65.1 |
| 5,368,355 | 11/1994 | Hayden et al. ........................ | 296/65.1 |
| 5,372,398 | 12/1994 | Aneiros et al. ........................ | 296/65.1 |
| 5,605,368 | 2/1997 | Noma et al. ............................. | 296/64 |
| 5,711,184 | 1/1998 | Pryor et al. ............................ | 74/89.15 |
| 5,711,505 | 1/1998 | Nemoto ................................... | 248/424 |
| 5,775,763 | 7/1998 | Glinter et al. ......................... | 296/65.1 |

FOREIGN PATENT DOCUMENTS 2702717 9/1994 France .

*Primary Examiner*—D. Glenn Dayoan
*Assistant Examiner*—Paul Chenevert
*Attorney, Agent, or Firm*—Pollock, Vande Sande & Amernick

[57] ABSTRACT

The slide for a removable automobile vehicle seat includes a U-shaped female section (2), attached to the floor of the vehicle, and a slider (3) equipped with anchoring means to which the seat (1) can be attached, the flanges (21) of the female U-shaped section being shaped so as to constitute guide paths for the guide elements (4) located laterally on either side of the slider. The guide elements are attached by transverse pins (5) which are attached to the slider and constitute the said anchoring means to attach the seat to the slider in a removable manner.

10 Claims, 2 Drawing Sheets

SLIDE FOR A REMOVABLE AUTOMOBILE VEHICLE SEAT

This invention concerns a slide for a removable automobile vehicle seat. In vehicles including such seats, such as people-carrier type vehicles, or vehicles called "monospace", these seats are conventionally secured to the floor by unlockable anchoring systems enabling easy removal of the seat without the need for tools.

Two types of anchoring systems are thus known which use at each foot of the seat, a hook hinged on the foot mating with an anchoring item attached to the floor. According to a first type, such as described in document FR-A-2556946, this anchoring element is a bar or a ring attached to the floor. According to a second type, such as described in document FR-A-2684934, the hook is anchored to the edge of a hole cut in the floor and into which the hook penetrates. With these systems, the position of the seats is determined by the position of the anchoring points on the floor. It is only by providing a number of anchoring points that the seats can be placed in various positions, the choice of these positions remaining however limited.

To provide greater flexibility in the positioning of the seats, it has already been envisaged to install these seats on slides. Document FR-A-2702717 shows a vehicle where the floor includes a number of longitudinal slides on which the removable seats can be installed and which enable the position of the seats to be adapted by sliding along these slides. For this purpose, the slides include a fixed rail, attached to the floor, and V-grooves are made in the lateral sides of the rail. U-shaped sliders fit over the rail and include plastic sliding elements which are guided in the V-grooves of the rail to ensure silent sliding of the slider on the said rail. The sliders are equipped at their ends with added rings onto which the feet of the seats are locked by the hook anchoring systems of the first type mentioned above. Locking means are also provided to lock the slider in longitudinal position in relation to the fixed portion of the slide. A specific advantage of this system is that it enables adjustment of the longitudinal position of the seat along the complete length of the rail, that is to say over a large distance, extending for example from the front seats up to the rear end of the vehicle.

Another slide system, also enabling a large adjustment range, is described in document US-A-4949931. In this system, the framework of the seat is fixed on each side to a slider equipped with rollers which run in guide paths formed by the bent flanges of a section generally U-shaped, open at the top and more or less symmetrical in relation to a vertical longitudinal median plane, this section constituting the fixed portions of the slide. All the seat shearing forces transit via the fasteners of the framework on the slider and from there to the rollers then to the fixed portion of the slide.

The aim of this invention is to provide a slide system for removable seats, especially adapted to also accommodate seats equipped with anchoring systems of the second type mentioned above. It also aims at improving safety by providing greater shearing strength for these seats in the case of an accident.

With these targets in mind, the subject of the invention is a slide for a removable automobile vehicle seat, including a U-shaped female section, open at the top and substantially symmetrical in relation to a vertical longitudinal median plane, attached to the floor of the vehicle, and a slider installed so as to slide between the flanges of the female section and equipped with anchoring means onto which the seat can be fixed, the flanges of the female U-section being shaped so as to constitute guide paths for the guide elements located laterally and symmetrically on either side of the slider characterised in that the said guide elements are connected together by transverse pins which are attached to the slider and constitute the said anchoring means for attaching the seat to the slider in a removable manner.

The seat is therefore connected as directly as possible to the guide elements. The loads that tend to raise the seat are transmitted from the seat locking hooks to the pins and from there directly to the guide elements and to the female section attached to the floor. If the vehicle is involved in an accident or is submitted to a violent shock, the seat rising loads pass therefore via the most direct path between the seat and the floor of the vehicle and are distributed in a substantially equal manner on both sides of the slide due to the longitudinal symmetry of the slide.

By comparison, in the system of document U.S. Pat. No. 4,949,931, the load flow transmission path is significantly longer. Also, in the known system described previously in document FR-A-2702717, the load flow passes from the seat to the ring located at the end of the slider, then are transmitted from the ring to the slider by the means attaching this ring to the slider, and from the slider to the fixed portion of the slide via the guide elements located between the slider and the fixed portion. The load flow therefore also takes a path significantly longer passing via several pieces with the increased risk of rupture or distortion of these pieces.

According to a preferential arrangement, the slider includes two pairs of guide elements, sliding in the guide paths formed by the grooves made in the flanges of the U-section of the slide. Instead of being elements sliding in the grooves of the female section, the guide elements could also be rolling elements, such as the rollers of document U.S. Pat. No. 4,949,931.

According to another arrangement, each pair of guide elements includes at least a pin to anchor the foot of the seat. According to this arrangement, the guide elements are located at each foot and therefore do not extend over the complete length of the slider. This thus leads to a reduction in costs and weight without reducing the rising strength because, as stated previously, the loads are transmitted by the connecting pins of the guide elements and, therefore, practically in a zone located in the vicinity of these pins.

According to yet another arrangement, the slider includes two lateral walls onto which the guide elements are held by the said pins which pass through the said lateral walls. Preferably, the slider is then formed of a U-shaped section the flanges of which constitute the said lateral walls and the base of which, located at the top, includes holes made at the level of the said pins to allow the feet of the seat to pass. This section is mainly used to maintain the spacing required between the two pairs of guide elements and the respective pins onto which the two feet located on the same side of the seat are anchored. This function would not necessarily require the use of such a section. However, this section can be advantageously used to install the locking means to lock the translation movement of the slider in relation to the fixed female section. Also note that this section can be an ordinary U-shaped section, without a specific profile intended to ensure guidance in relation to the female section and, therefore, not very expensive, as the guide elements are added to this section. Also, the seat bearing or rising forces do not pass via this section the mechanical strength of which need not therefore be especially high as it has no influence on the seat rising strength.

According to another preferential arrangement, a spacer is placed around the pin, between the guide elements. This tubular spacer maintains the required spacing between the guide elements and increases the cross-section submitted to the bending and shear forces exerted by the feet of the seat and their locking hooks.

Preferentially, the ends of the spacer are fitted into bores made in the lateral walls of the slider and, in addition, each guide element includes a boss inserted into a cutout of corresponding shape made in the lateral wall of the slider. Thus, the lateral walls also participate in transmitting the loads, via the ends of the said spacers and the said bosses.

The guide elements are preferentially equipped with added slide pads, made of a material with a good friction coefficient, to facilitate sliding during normal use. These pads protrude only slightly beyond the guide elements which are made of steel or another metal with a high mechanical strength. Thus, in case of high forces exceeding the capacities of the friction pads, these forces are transmitted directly by the guide elements to the female sections without significant plays or distortions appearing in the attachment between the slider and the female section.

Other characteristics and advantages will appear in the description which will be given only as an example of a slide in compliance with the invention.

Figure 2:
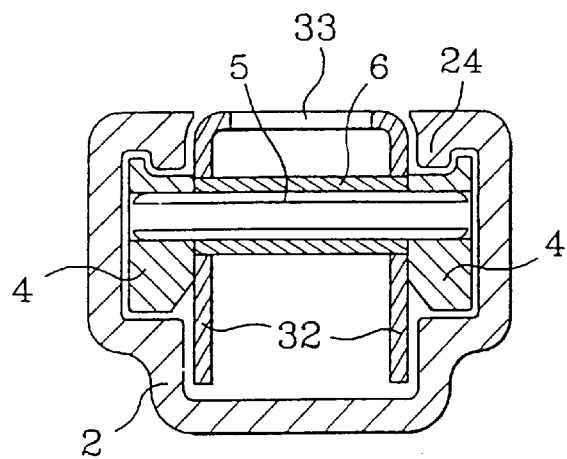
Figure 3:
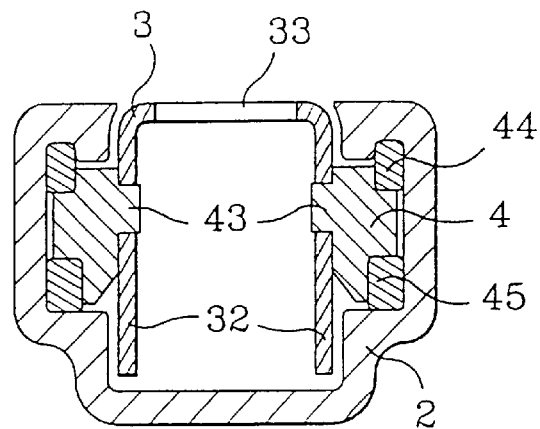
Figure 4:
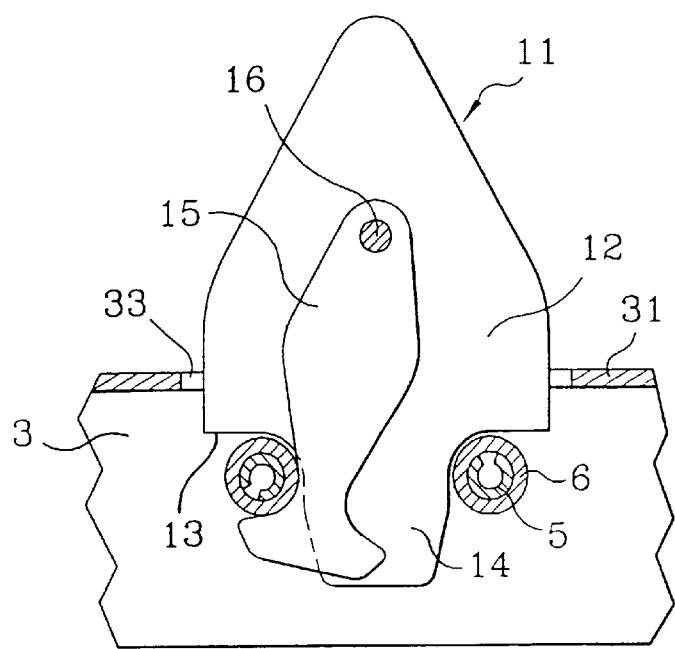

Refer to the appended drawings on which:

FIG. 1 shows a perspective view of the slide, the slider being shown outside of the female section, FIG. 2 shows a cross-sectional view through the plane defined by line II—II on FIG. 1, FIG. 3 shows a cross-sectional view through the plane defined by line III—III on FIG. 1, FIG. 4 shows a partial longitudinal cross-sectional view showing the anchoring of the seat on the slider in a simplified manner.

On the drawing of FIG. 1, the lower lateral portion of the framework of seat 1, bearing the feet 11, is represented schematically. Each foot consists of a plate 12 attached to the framework and has a lower bearing edge 13 and a centering tab 14 extending downwards beyond the bearing edge.

The foot also includes an anchoring mechanism consisting, in the example shown, of a dual hook 15 installed so as to pivot on the plate 12 around a hinge point 16. It also includes means, not shown, to control the pivoting and the locking of hook 15 in position. For further details on such control and locking means, refer especially to above mentioned document FR-A-2684934. It can be noted that neither the design of the foot shown on the appended drawings nor that shown in the above mentioned document are restrictive for the applications of this invention, any attachment and anchoring system can be used to attach a seat to a slide in compliance with the invention provided that this system includes a hook designed to mate with the anchoring means of the slide as will be seen later.

The slide includes a female section 2 attached to the floor of the vehicle, not shown, and a male section 3 forming the slider and equipped with guide elements 4 to ensure its sliding in relation to the female section. This female section can for example extend over a large portion of the floor, in the longitudinal direction of the vehicle, to enable the seat to be positioned in a number of positions along this section and, preferably, it will be placed so that it does not protrude beyond the top of the floor.

The female section 2, for example a moulded or extruded metallic alloy section, is generally U-shaped and open at the top with two flanges 21 shaped so as to constitute guide grooves for the guide elements 4, these grooves having a lower edge 22 and an upper edge 23 with a trapezoidal-shaped cross-section obtained by a hook-shaped flange return 24 formed from the upper edges 23 of the flanges 21 of the female section.

The male section 3 consists of a U-shaped section, for example, made of folded steel sheet, including a base 31 located at the top, and two flat and parallel walls 32. Holes 33 are cut in the base 31 of the male section 3 of a size sufficient to enable the feet 11 of the seat 1 to pass through them and with a spacing corresponding to that of the said feet. Unlike the female section 2, the male section 3 is relatively short, simply sufficient to accommodate the two feet of the seat as will be seen later.

The guide elements 4 are placed on each side of the male section 3 at each of the holes 33, against the walls 32. The cross-sectional shape of the guide elements 4 corresponds to the shape of the grooves of the female section 20 and their lengths, in the longitudinal direction, are similar to the length of the holes 33. As it can be seen on FIG. 2, pins, for example, split pins 5, connect the two guide elements 4 located on either side of the male section 3, by passing through the walls 32 of this section and with their ends force-fitted into bores 42 made in the guide elements 4. Tubular spacers 6 are placed over the pins 5 the ends of these spacers abuting against the guide elements 4 and inserted into bores of corresponding diameter made in the walls 32 of the male section 3.

The two guide elements 4 of a given pair are connected, as described above, by two sets of pins 5 and spacers 6, the distance between the spacers being substantially equal to the width of the tab 14 of the foot 11 of the seat, as can be seen on FIG. 4, so as to ensure the centering of the foot in relation to the pins 5 and the guide elements 4.

These guide elements also include a circular boss 43, located in median position between the two pins, inserted into a corresponding bore made in the lateral walls 32 of the male section, as it can be seen on FIG. 3. Slide pads 44, 45 are also placed in dovetails machined in the upper and lower edges of the guide elements respectively. These pads slightly protrude beyond the outer surfaces of the guide elements 4 and are alone in contact with the edges 22 and 23 of the grooves of the female section 2 during the normal use of the slide. It is only when high loads are exerted that the metallic portion of the guide elements 4 may be brought into contact with the female section 2.

As can be seen on FIG. 4, the seat is held onto the slider by the fact that the edges 13 of the feet 11 bear on the spacers 6, by the centring of the tab 14 between the spacers 6, and by the engagement of the hook 15 under one of the two spacers 6, the hook 15 being maintained in this position by locking means, of a type known itself, not shown. The slide also includes locking means for locking the translation movement of the male section in relation to the female section, not shown as outside of the scope of this invention.

The invention is not limited to the design described above only as an example. In particular, the relevant arrangement of the guide elements 4 and the pins 5 and spacers 6 in relation to the holes 33 could be modified to enable the feet 11 to be anchored in a manner different from the one shown, for example by feet including a fork open at the bottom and which can fit over a pin or spacer and also including a pivoting hook engaging under this pin.

Also, the connecting pins 5 and one of the guide elements 4 could be made so as to form a single piece and engage, by passing through the walls of the slider, in bores made in the other guide element 4.

The guide elements 4 could also extend over a higher length, greater than the distance between the two feet 11 of the seat 1, and be connected, for example, by a single pin 5 at each foot 11.

We claim:

1. A slide for a removable automobile vehicle seat, including a U-shaped female section (2) open at the top, and a slider (3) installed so as to slide between a pair of flanges (21) of the female section and equipped with anchoring means to which the seat (1) can be attached, the flanges of the U-shaped female section being shaped so as to constitute guide paths for guide elements (4) located laterally and symmetrically on either side of the slider, characterized in that the said guide elements are connected by transverse pins (5) which are attached to the slider and constitute the said anchoring means to attach the seat to the slider in a removable manner.

2. The slide in accordance with claim 1, characterized in that the slide includes two pairs of said guide elements (4), each pair including at least one of said pins (5) to anchor a foot (11) of the seat.

3. The slide in accordance with claim 1, characterized in that the slider includes two lateral walls (32) onto which the guide elements (4) are held by the said pins (5) which pass through the said lateral walls.

4. The slide in accordance with claim 3, characterized in that a spacer (6) is placed around the pin (5), between the guide elements (4).

5. The slide in accordance with claim 4, characterized in that the ends of the spacer (6) are fitted into bores made in the lateral walls (32) of the slider.

6. The slide in accordance with claim 3, characterized in that each of said guide element (4) includes a boss (43) inserted into a cutout of corresponding shape made in the lateral walls (32) of the slider.

7. The slide in accordance with claim 1, characterized in that the guide elements are installed so as to slide in grooves made in the flanges of the female section.

8. The slide in accordance with claim 7, characterized in that the guide elements (4) are equipped with added slide pads (44, 45).

9. The slide in accordance with claim 2, characterized in that one of said pair of guide elements are connected by two of said plurality pins (5) with, in the longitudinal direction, a space designed to accommodate a seat foot centering tab (14).

10. The slide in accordance with claim 3, characterized in that the slider consists of a U-shaped section (3), including flanges of which constitute the said lateral wall (32) and a base (31) of which, located at the top, includes holes (33) made at the level of the said pins to enable a plurality of seat feet (11) to pass through the said holes.

* * * * *

UNITED STATES PATENT AND TRADEMARK OFFICE
CERTIFICATE OF CORRECTION

PATENT NO. : 5,921,606
DATED : July 13, 1999
INVENTOR(S) : Pierre Moradell et al.

It is certified that error appears in the above-identified patent and that said Letters Patent is hereby corrected as shown below:

On the title page item [73], Assignee data, "Berstrand" should read --Bertrand-- and "Equipments" should read --Equipements--.

Signed and Sealed this

Fourth Day of January, 2000

Attest:

Attesting Officer

Acting Commissioner of Patents and Trademarks